(12) United States Patent
Mani Biswas

(10) Patent No.: US 9,190,114 B1
(45) Date of Patent: Nov. 17, 2015

(54) DISK DRIVE FILTER INCLUDING FLUORINATED AND NON-FLUORINATED NANOPOUROUS ORGANIC FRAMEWORK MATERIALS

(71) Applicant: Western Digital Technologies, Inc., Irvine, CA (US)

(72) Inventor: Mousumi Mani Biswas, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/617,847

(22) Filed: Feb. 9, 2015

(51) Int. Cl.
*G11B 33/14* (2006.01)

(52) U.S. Cl.
CPC .................................. *G11B 33/146* (2013.01)

(58) Field of Classification Search
CPC .............. G11B 5/65; G11B 5/82; G11B 5/66; G11B 5/855; G11B 2020/1281; G11B 20/1217
USPC ....................................................... 360/97.17
See application file for complete search history.

(56) References Cited

U.S. PATENT DOCUMENTS

| | | | |
|---|---|---|---|
| 5,055,332 A | 10/1991 | Rhodes et al. |
| 5,235,482 A | 8/1993 | Schmitz |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,272,694 B1 | 8/2001 | Weaver et al. |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |

(Continued)

FOREIGN PATENT DOCUMENTS

| | | |
|---|---|---|
| CA | 02704521 A1 | 5/2010 |
| EP | 2107570 A1 | 10/2009 |

(Continued)

OTHER PUBLICATIONS

Hiroyasu Furukawa, et al., "The Chemistry and Applications of Metal-Organic Frameworks," Science, vol. 341, Aug. 30, 2013, pp. 1230444-1-1230444-12.

(Continued)

*Primary Examiner* — Mark Blouin

(57) ABSTRACT

A disk drive includes a disk drive base, a rotating spindle attached to the disk drive base, and a disk mounted on the rotating spindle. A disk drive cover is attached to the disk drive base to enclose the disk in a disk drive enclosure. A filter within the disk drive enclosure includes first and second nanoporous adsorbent materials, each being either a metal organic framework material or a covalent organic framework material. The first nanoporous adsorbent material is fluorinated, and the second nanoporous adsorbent material is not fluorinated.

17 Claims, 7 Drawing Sheets

(56) References Cited

U.S. PATENT DOCUMENTS

| | | |
|---|---|---|
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,582,279 B1 | 6/2003 | Fox et al. |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Hanan et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,842,306 B2 | 1/2005 | Cyrille et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,116,532 B2 | 10/2006 | Carey et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |

(56) References Cited

U.S. PATENT DOCUMENTS

| | | |
|---|---|---|
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,811,539 B2 | 10/2010 | Deeken et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,057,584 B2 | 11/2011 | Schubert et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,119,012 B2 | 2/2012 | Bahm et al. |
| 8,125,740 B1 | 2/2012 | Yang et al. |
| 8,142,671 B1 | 3/2012 | Pan |
| 8,156,633 B1 | 4/2012 | Foisy |
| 8,159,778 B2 | 4/2012 | Gao et al. |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,336,863 B2 | 12/2012 | Neumann et al. |
| 8,345,387 B1 | 1/2013 | Nguyen |
| 8,363,351 B1 | 1/2013 | Little |
| 8,369,044 B2 | 2/2013 | Howie et al. |
| 8,372,477 B2 | 2/2013 | Buelow et al. |
| 8,388,718 B2 * | 3/2013 | Gutsche et al. ............... 55/486 |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,450,048 B2 * | 5/2013 | Hatakeyama et al. ........ 430/313 |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,563,464 B2 | 10/2013 | Schubert et al. |
| 8,616,900 B1 | 12/2013 | Lion |
| 8,647,419 B2 | 2/2014 | Kaskel |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,697,191 B2 | 4/2014 | Gaab et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,709,134 B2 | 4/2014 | Yaghi et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,771,403 B2 | 7/2014 | Chang et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |

(56) References Cited

U.S. PATENT DOCUMENTS

| | | |
|---|---|---|
| 8,824,098 B1 | 9/2014 | Huang et al. |
| 2008/0190289 A1 | 8/2008 | Muller et al. |
| 2009/0014002 A1* | 1/2009 | Krafthefer et al. ....... 128/205.18 |
| 2009/0032023 A1 | 2/2009 | Pastre et al. |
| 2010/0091414 A1 | 4/2010 | Yuasa et al. |
| 2011/0031103 A1 | 2/2011 | Deckman et al. |
| 2011/0138781 A1 | 6/2011 | Richter et al. |
| 2011/0212281 A1 | 9/2011 | Jacoby et al. |
| 2012/0312314 A1 | 12/2012 | Plakidis et al. |
| 2013/0032160 A1 | 2/2013 | Bromberg et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0283849 A1 | 10/2013 | Baumann et al. |
| 2013/0290988 A1 | 10/2013 | Watson et al. |
| 2014/0202330 A1 | 7/2014 | Meirav et al. |

FOREIGN PATENT DOCUMENTS

| | | |
|---|---|---|
| EP | 2298440 A1 | 3/2011 |
| EP | 2336239 A1 | 6/2011 |
| WO | 2012077030 A1 | 6/2012 |
| WO | 2012131483 A1 | 10/2012 |

OTHER PUBLICATIONS

Hiroyasu Furukawa, et al., "Water Adsorption in Porous Metal-Organic Frameworks and Related Materials," Journal of the American Chemical Society, vol. 136, 2014, pp. 4369-4381.

Radha Kishnan Motkuri, et al., "Fluorocarbon adsorption in hierarchical porous frameworks," Nature Communications, vol. 5, Jul. 9, 2014, Article No. 4368.

Frederick J. Hanke, et al., U.S. Appl. No. 14/322,764, filed Jul. 2, 2014, 18 pages.

* cited by examiner

ND NON-FLUORINATED
DISK DRIVE FILTER INCLUDING FLUORINATED AND NON-FLUORINATED NANOPOUROUS ORGANIC FRAMEWORK MATERIALS

BACKGROUND

The performance and reliability of a hard disk drive may be adversely affected by volatile contaminants that may be generated from disk or spindle lubricant, carbon, pivot oil, and other sources. For example, such contaminants may migrate to the head-disk interface where they can undesirably increase head-disk spacing and/or have adverse tribological effects. Activated carbon has been used within hard disk drive enclosures to help control contaminants. Desiccants also have been used within hard disk drive enclosures to control internal moisture.

However, activated carbon may not adequately adsorb certain hydrocarbons, siloxane, and fluorinated volatile organic compounds that are of particular prevalence or importance in disk drive applications. Therefore, there is a need in the art for a disk drive filter design that can better adsorb the specific contaminates that are expected to be generated within the disk drive enclosure and/or to be important within the disk drive enclosure.

DETAILED DESCRIPTION OF EXAMPLE EMBODIMENTS

Figure 1:
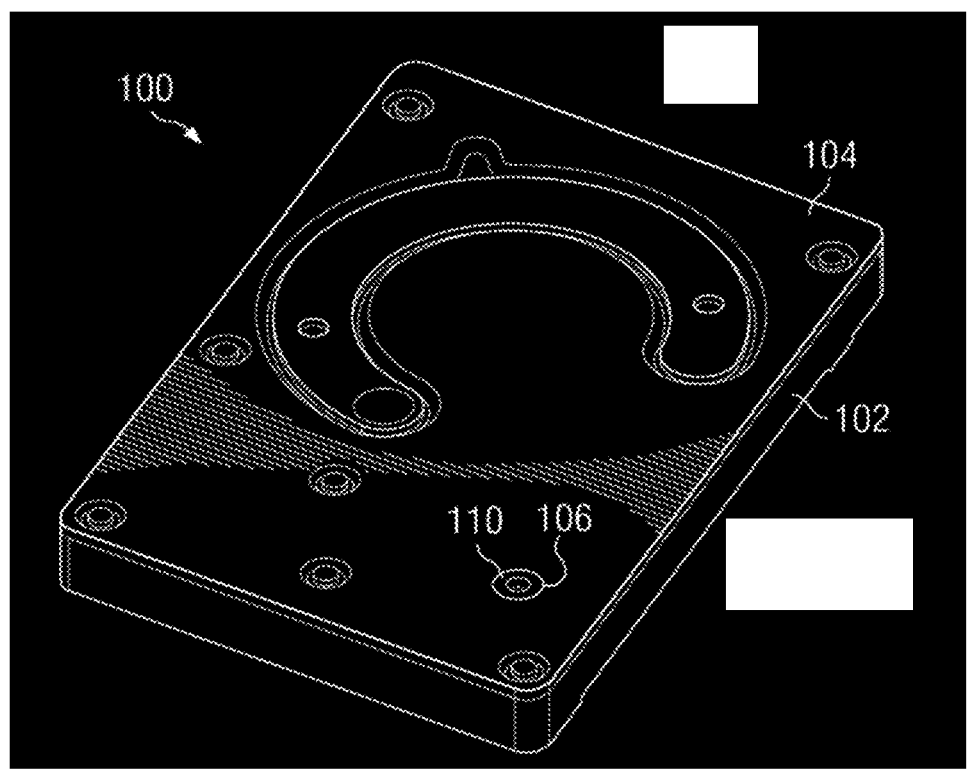
FIG. 1 is a top perspective view of a disk drive capable of including an embodiment of the present invention, with the disk drive top cover in place.

FIG. 1 is a top perspective view of a disk drive 100 that is capable of including an embodiment of the present invention, which has a disk drive enclosure formed by a disk drive base 102 and a disk drive cover 104. The disk drive enclosure may also be completed by gasket, seal, fastener and filter components. The disk drive cover 104 is shown in FIG. 1 to be in place and attached to the disk drive base 102. The disk drive cover 104 may optionally include a hole 106 therethrough, for example to allow limited fluid communication of outside air to a breather filter entrance region 110.

Figure 2:
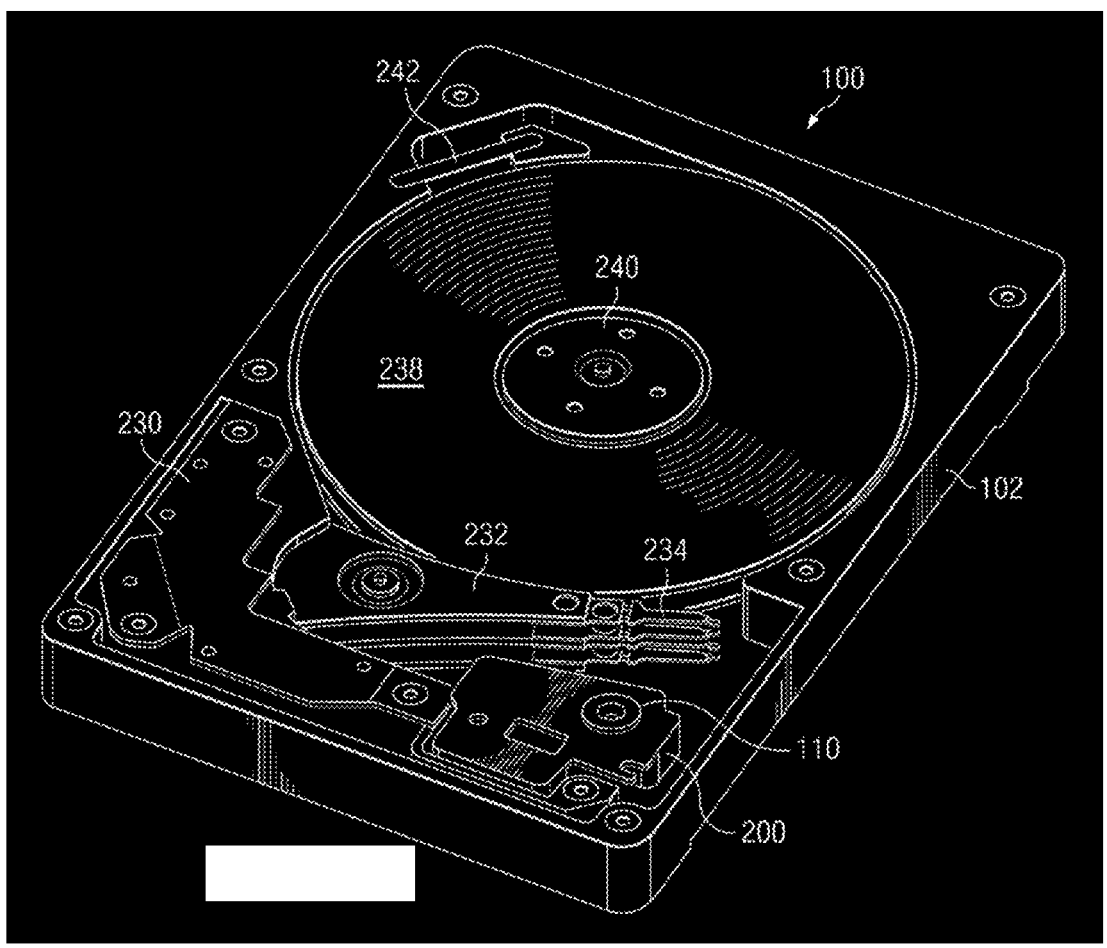
FIG. 2 is a top perspective view of a disk drive capable of including an embodiment of the present invention, with the disk drive top cover removed to show some internal components.

FIG. 2 is a top perspective view of the disk drive 100 of FIG. 1, except with the disk drive top cover 104 removed to show some internal components. Now referring additionally to FIG. 2, the disk drive 100 includes a breather filter 200 adjacent the disk drive base 102. The disk drive 100 also includes various other internal components, such as a voice coil motor 230, rotary actuator 232, at least one head suspension 234, at least one disk 238 mounted on a spindle motor 240, and a recirculation filter 242. Not all internal components of disk drive 100 are shown in FIG. 2, for example a conventional head loading ramp may be positioned adjacent the disk(s) 238 to facilitate merging of the head suspensions 234 onto the disk(s) 238, but is not shown for a more clear view of the breather filter 200.

Figure 3:
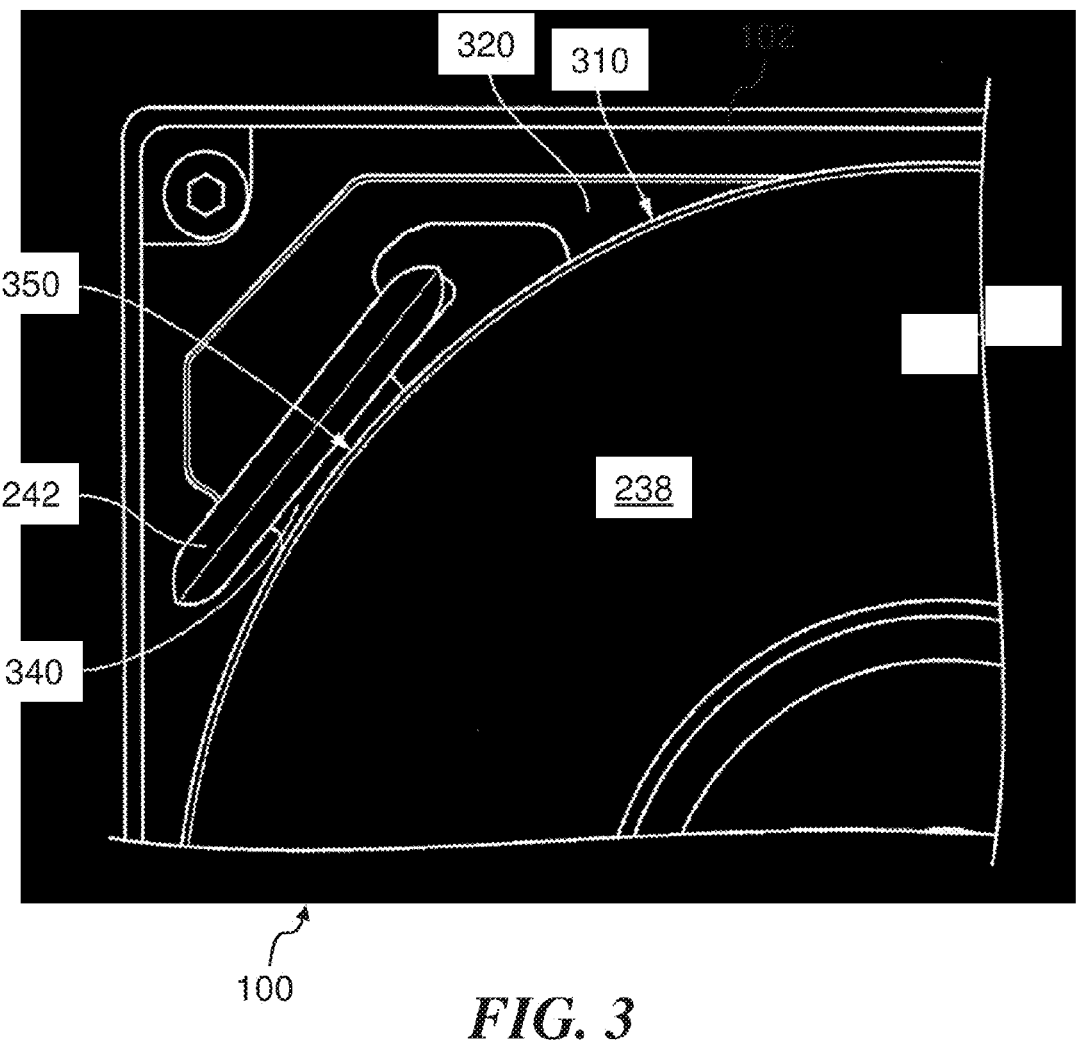
FIG. 3 is a plan view of a corner region of a disk drive, including a recirculation filter that is capable of including an embodiment of the present invention.

FIG. 3 is a plan view of a corner region of the disk drive 100 of FIG. 2, which includes the recirculation filter 242. Rotation of the disk(s) 238 induces air flow within the disk drive 100, which flows away from the disk outer periphery at location 310, and then through channel 320 formed in the disk drive base 102. The induced air flow is then directed to flow through the recirculation filter 242, and then through channel 340 back to the disk outer periphery at location 350. In this way, the rotation of the disk(s) 238 causes the air (or alternative gas) within the disk drive enclosure to pass through the recirculation filter 242.

Figure 4:
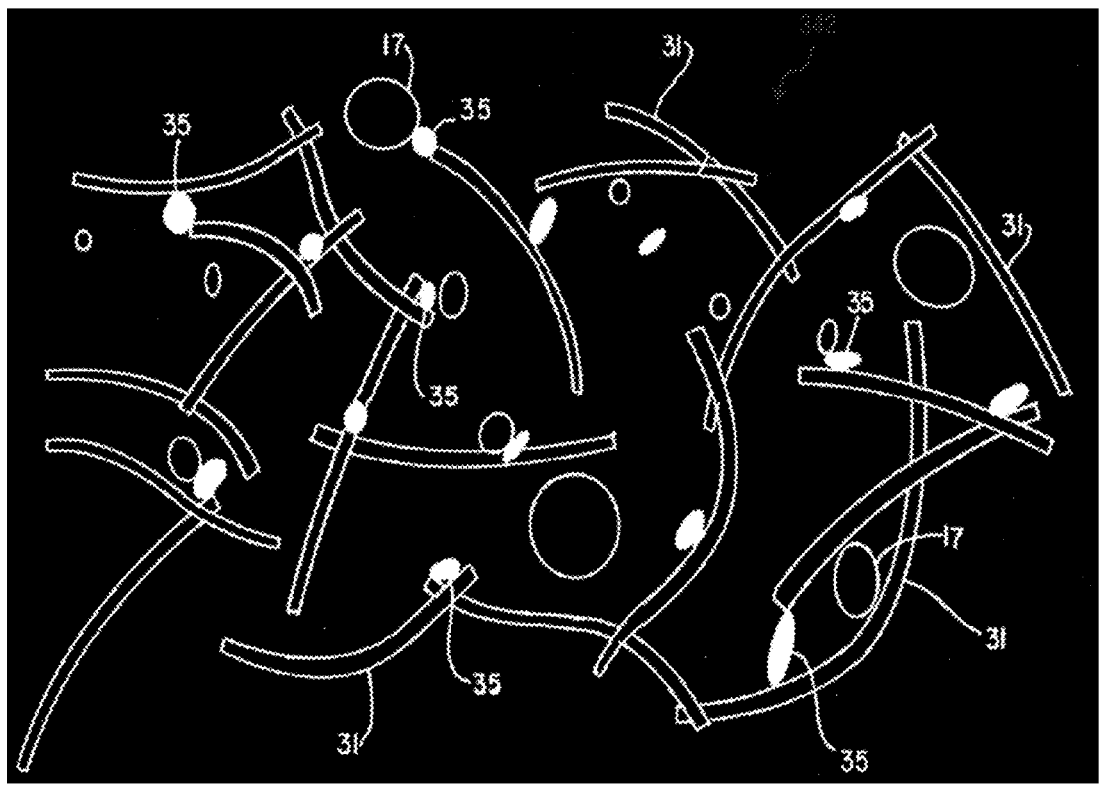
FIG. 4 is a simplified representation of a small region of a recirculation filter mesh according to an embodiment of the present invention.

FIG. 4 is a simplified representation of a small region of a recirculation filter mesh 342 according to an embodiment of the present invention. The recirculation filter mesh 342 includes fibers 31 that are impregnated with embedded granules of a first nanoporous adsorbent material 35 and second nanoporous adsorbent material 17. Each of the nanoporous adsorbent materials 35 and 17 is either a metal organic framework (MOF) material or a covalent organic framework (COF) material. The first nanoporous adsorbent material 35 is fluorinated and the second nanoporous adsorbent material 17 is not fluorinated. In this context, a nanoporous adsorbent material is considered to be fluorinated if each of its MOF or COF molecules includes at least one fluorine atom.

Figure 5:
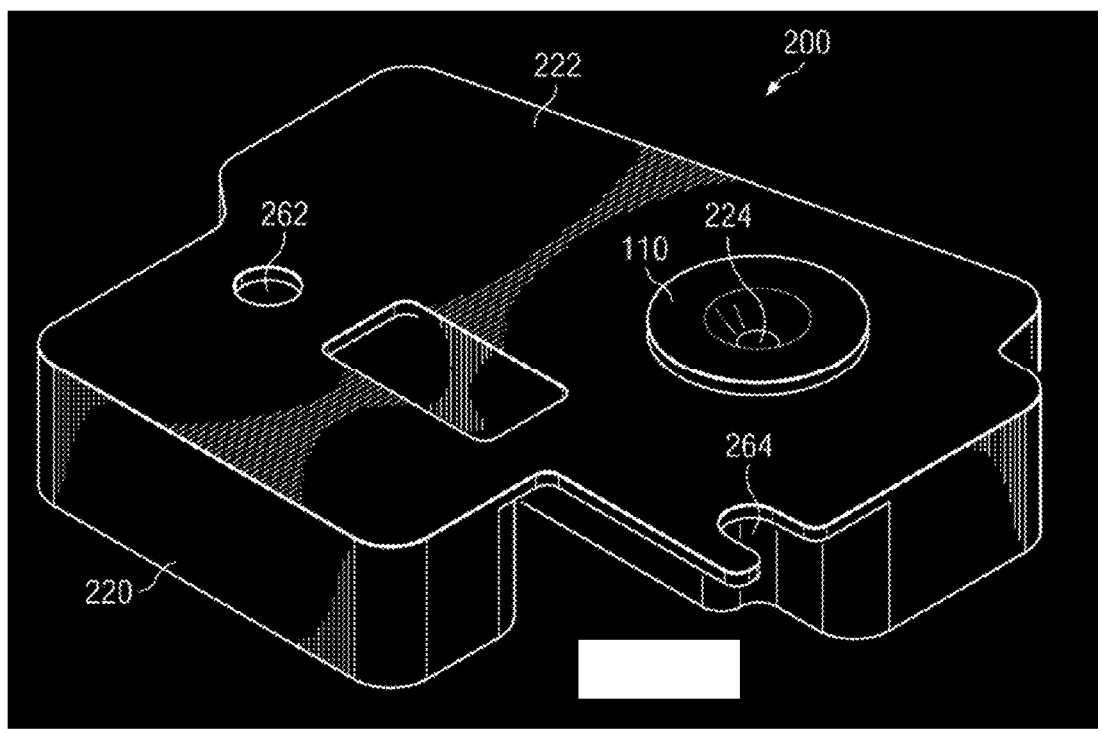
FIG. 5 is a top perspective view of a disk drive breather filter that is capable of including an embodiment of the present invention.

FIG. 5 is a top perspective view of a disk drive breather filter 200 that is capable of including an embodiment of the present invention. Now referring to FIG. 5, the breather filter 200 includes a breather filter housing 220 having a top surface 222. A breather filter entrance region 110 protrudes from the top surface 222 of the breather filter housing 220. The breather filter entrance region 110 includes an entrance port 224. The breather filter 200 may be located by its tooling hole 262 and clocking slot 264.

Figure 6:
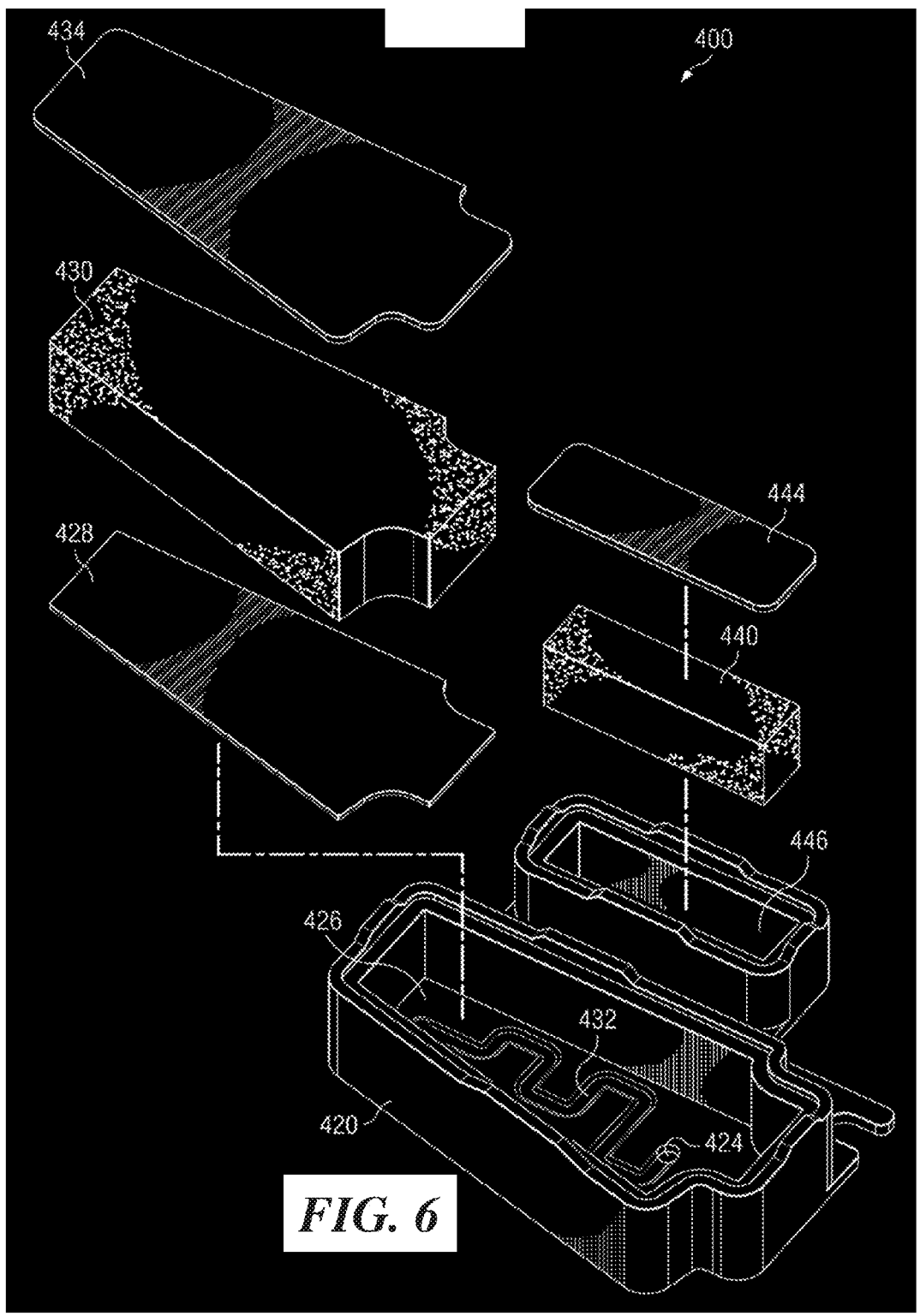
FIG. 6 is an exploded top perspective view of a disk drive breather filter that is capable of including an embodiment of the present invention.

FIG. 6 is an exploded top perspective view of a disk drive breather filter 400 that is capable of including an embodiment of the present invention. The breather filter 400 includes a breather filter housing 420. The breather filter housing 420 includes a labyrinth path 432 that extends from an entrance port 424 to a primary internal container 426. A labyrinth seal layer 428 adheres to the breather filter housing 420 inside the primary internal container 426 to seal the labyrinth path 432 over the entrance port 424 and along the labyrinth path 432 (except for a distal end of the labyrinth path 432 that remains open to the primary internal container 426). In this way, the labyrinth seal layer 428 effectively lengthens the gas diffusion path from the primary internal container 426 through the entrance port 424 to the outside of the breather filter housing 420, to include almost the entire labyrinth path length.

The labyrinth seal layer 428 may comprise an impermeable polymer material, for example. The length of the labyrinth path 432 may be chosen to slow gas flow or diffusion through the entrance port 424 into/from the primary internal container 426, to achieve a desired limited gas flow or limited diffusion rate under expected operating conditions. For example, the labyrinth path may be chosen to be at least 10 times longer than its greatest transverse dimension, to adequately limit the gas diffusion rate in certain embodiments.

In the embodiment of FIG. 6, a first nanoporous adsorbent material 430 may be disposed in the primary internal container 426, with the labyrinth seal layer 428 disposed between the first nanoporous adsorbent material 430 and the labyrinth path 432. Also in the embodiment of FIG. 6, a filter layer 434 may cover the first nanoporous adsorbent material 430, and may be adhered to a periphery of the primary internal container 426 of the breather filter housing 420. The filter layer 434 may comprise a porous polymer material such as a polytetrafluoroethylene (PTFE) membrane, for example.

The breather filter 400 of the embodiment of FIG. 6 also optionally includes a secondary container 446 in the breather filter housing 420. Optionally, unlike the primary internal cavity 426, there is no gas diffusion path through the secondary container 446 to the outside of the disk drive enclosure (e.g. via the entrance port 424). A second nanoporous adsorbent material 440 may be disposed within the secondary container 446. A secondary filter layer 444 may cover the second nanoporous adsorbent material 440, and the secondary filter layer 444 may comprise the same material as the filter layer 434.

Alternatively, the primary internal container 426 may include granules of both the first and second nanoporous adsorbent materials. In such an alternative embodiment, the secondary container 446 may optionally include a desiccant material. In the embodiment of FIG. 6, the first nanoporous adsorbent material 430 and the second nanoporous adsorbent material 440 are each either a metal organic framework (MOF) material or a covalent organic framework (COF) material. The first nanoporous adsorbent material 430 is fluorinated and the second nanoporous adsorbent material 440 is not fluorinated. In this context, a nanoporous adsorbent material is considered to be fluorinated if each of its MOF or COF molecules includes at least one fluorine atom.

Figure 7:
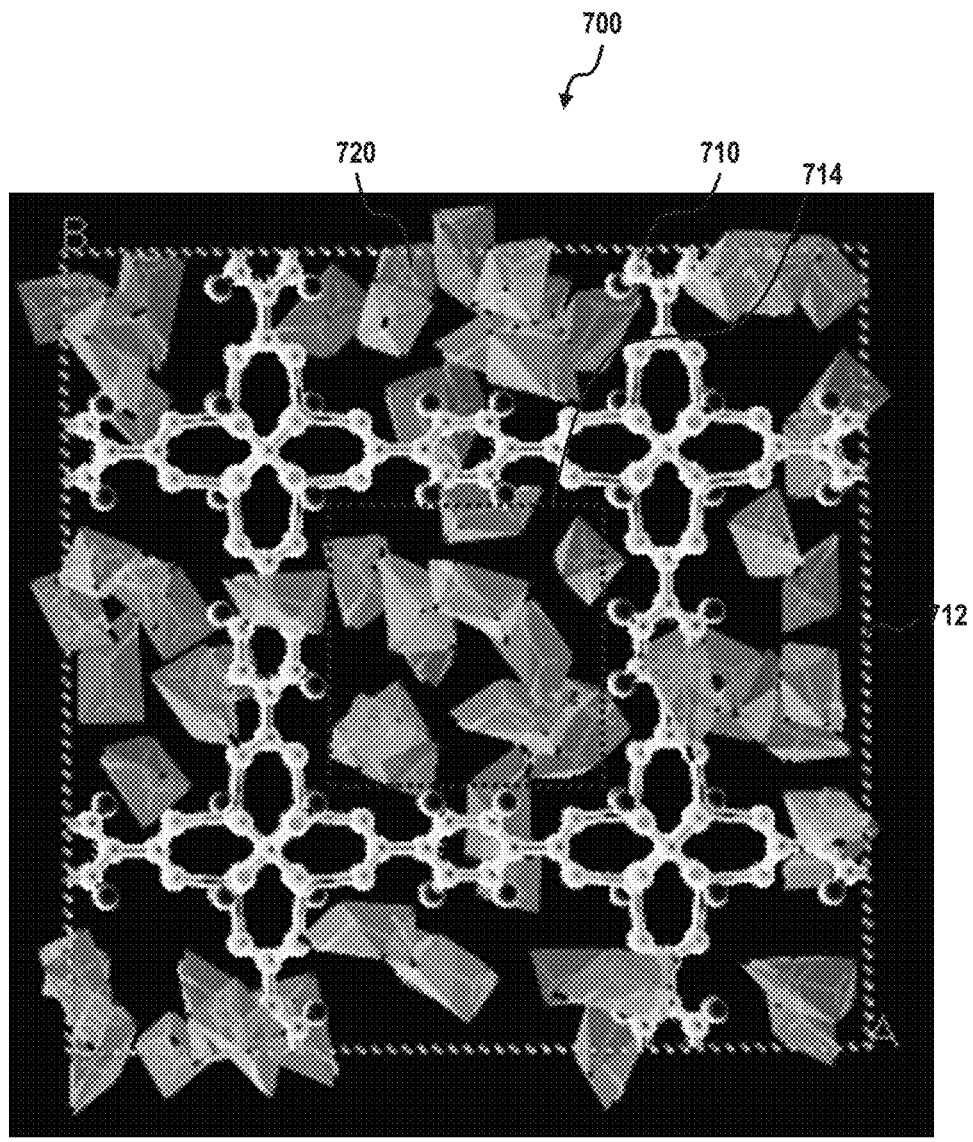
FIG. 7 is a simplified representation of a microscopic region of a three-dimensional metal organic framework nanostructure, after adsorbing contaminate particles.

FIG. 7 is a simplified representation of a microscopic region 700 of a three-dimensional MOF nanostructure 710 after adsorbing contaminate particles 720. The MOF nanostructure 710 includes periodically repeating crystal structure 712 that may be three dimensional, each crystal structure 712 including a nanopore 714. The inventive concept is not limited to three-dimensional MOF nanostructures, as the use of two-dimensional MOF nanostructures is also contemplated herein.

In the embodiments of FIGS. 4 and 6, the first and/or second nanoporous adsorbent material may comprise a MOF material that includes a metal (e.g. Zn, Cu, Mn, Cr, Fe, Al, or Ni) or a metalloid such as Si, and an organic linker. In one preferred embodiment, the MOF adsorbent material may comprise a plurality of secondary building units that include octahedral $Zn_4O(CO_2)_6$ and that are connected by 1,4-benzenedicarboxylate units in a cubic framework.

In certain embodiments, the organic linker in the MOF adsorbent material preferably but does not necessarily comprise azobenzene-3,30,5,50-tetracarboxylate; 5,50-(9,10-anthracenediyl)di-isophthalate; 9,10-anthracenedicarboxylate; azoxybenzene-3,30,5,50-tetracarboxylate; 1,4-benzenedicarboxylate; 1,4-benzenedipyrazolate; biphenyl-3,40,5-tricarboxylate; 4,40-biphenyldicarboxylate; 4,40-trans-bis(4-pyridyl)-ethylene; benzophenone-4,40-dicarboxylate; 3,30,5,50-biphenyltetracarboxylate; 4,40-bipyridine; 1,3,5-tri(4-carboxyphenyl)benzene; benzenetricarboxylate; 1,3,5-benzenetristetrazolate; 1,4-diazabicyclo[2.2.2]octane; 1,2-dihydrocyclobutabenzene-3,6-dicarboxylate; 2,5-dihydroxyterephthalic acid; N,N0-dimethylformamide; fumarate; 4,5,9,10-tetrahydropyrene-2,7-dicarboxylate; 2-methylimidazole; 2,6-naphthalenedicarboxylate; oxydiacetate; pyridine-3,5-bis(phenyl-4-carboxylate); quaterphenyl-3,30 0 0,5,50 0 0-tetracarboxylate; trans-stilbene-3,30,5,50-tetracarboxylic acid; 4,40,40 0-s-triazine-2,4,6-triyltribenzoate; thieno[3,2-b]thiophene-2,5-dicarboxylate; terphenyl-3,30 0,5,50 0-tetracarboxylate; 1,3,5-tri-p-(tetrazol-5-yl)phenylbenzene; 2,4,6-tri-p-(tetrazol-5-yl)phenyl-s-triazine; 1,2,4-triazolate; thieno[3,2-b]thiophene-2,5-dicarboxylate; tetrakis(4-tetrazolylphenyl)methane; or triphenylene-2,6,10-tricarboxylate.

In certain embodiments, the MOF adsorbent material may have a structure that includes one or more porphyrin units, and may comprise one or more functional groups such as —$NO_2$, —OH, —COOH, —CN, or —$SO_3$. This may also be true for a COF adsorbent material used in the embodiments of FIGS. 4 and 6. However, the COF adsorbent material also preferably includes an organic covalent linkage (e.g. C—C, C—O, C—N, or Si—C) or a non-organic covalent linkage such as B—O.

The example disk drive adsorbent filters described above may, in certain embodiments, better adsorb the specific contaminates that are expected to be generated within the disk drive enclosure and/or to be important within the disk drive enclosure. For example, $CF_3CH_2OH$, silane, and $C_4H_{10}$ may be of particular prevalence or importance in certain disk drive applications because they may be created by lubricant degradation, and be well adsorbed by one or more of the embodiments described herein. Other common disk drive contaminates include particulates and hydrocarbons from various internal and external sources, including but not limited to lubricant degradation.

In the foregoing specification, the invention is described via specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed:

1. A disk drive comprising:
   a disk drive base;
   a rotating spindle attached to the disk drive base;
   a disk mounted on the rotating spindle;
   a disk drive cover attached to the disk drive base to enclose the disk in a disk drive enclosure; and
   a filter within the disk drive enclosure, the filter including first and second nanoporous adsorbent materials, each selected from the group consisting of metal organic framework materials and covalent organic framework materials, wherein the first nanoporous adsorbent material is fluorinated and the second nanoporous adsorbent material is not fluorinated.

2. The disk drive of claim 1 wherein the filter is a recirculation filter.

3. The disk drive of claim 2 wherein the recirculation filter is impregnated with the first and second nanoporous adsorbent materials.

4. The disk drive of claim 1 wherein the filter is a breather filter.

5. The disk drive of claim 4 wherein the breather filter includes a first container that includes the first nanoporous adsorbent material and a second container that includes the second nanoporous adsorbent material.

6. The disk drive of claim 4 wherein the breather filter includes a first container that includes first granules of the first nanoporous adsorbent material and second granules of the second nanoporous adsorbent material.

7. The disk drive of claim 6 wherein the breather filter further includes a second container that includes a desiccant material.

8. The disk drive of claim 1 wherein the first nanoporous adsorbent material is a metal organic framework adsorbent material that includes an organic linker and a metal selected from the group consisting of Zn, Cu, Mn, Cr, Fe, Al, and Ni.

9. The disk drive of claim 8 wherein the metal organic framework adsorbent material has a structure that includes a porphyrin unit.

10. The disk drive of claim 8 wherein the metal organic framework adsorbent material has a structure of periodically repeating crystal structure that are three dimensional, each crystal structure including a nanopore.

11. The disk drive of claim 8 in which the metal organic framework adsorbent material comprises a functional group selected from the list consisting of —$NO_2$, —OH, —COOH, —CN, and —$SO_3$.

12. The disk drive of claim 1 wherein the second nanoporous adsorbent material is a covalent organic framework adsorbent material that includes a functional group selected from the list consisting of —$NO_2$, —OH, —COOH, —CN, and —$SO_3$.

13. The disk drive of claim 1 wherein the filter further includes a non-covalent organic framework adsorbent material.

14. The disk drive of claim 8 wherein the metal organic framework adsorbent material comprises a plurality of secondary building units that include octahedral $Zn_4O(CO_2)_6$ that are connected by 1,4-benzenedicarboxylate units in a cubic framework.

15. The disk drive of claim 12 in which the covalent organic framework adsorbent material comprises a covalent linkage selected from the group consisting of C—C, C—O, C—N, Si—C and B—O.

16. The disk drive of claim 1 further comprising a contaminant selected from the group consisting of $CF_3CH_2OH$, silane, and $C_4H_{10}$.

17. The disk drive of claim 8 wherein the metal organic framework adsorbent material includes Si and an organic linker.

* * * * *